United States Patent Office 3,258,463
Patented June 28, 1966

3,258,463
PHOSPHORO SULFENATES
Glenn R. Price, South Chicago Heights, and Edward N. Walsh, Chicago Heights, Ill., and James T. Hallett, Saratoga, Calif., assignors to Stauffer Chemical Company, New York, N.Y., a corporation of Delaware
No Drawing. Filed Aug. 29, 1961, Ser. No. 134,590
6 Claims. (Cl. 260—251)

This invention is directed to a new class of phosphorus-containing compounds, their method of preparation and use as herbicides and pesticides.

In particular, the invention relates to phosphoro sulfenates comprising a $$=\overset{\overset{X}{\|}}{P}-S-O-R$$

structure wherein X is oxygen or sulfur. They are selectively active as post- and pre-emergence herbicides and also effective in controlling mites, nematodes, aphids and insects of the various common orders.

The new compounds of the invention may be represented by the general formula:

$$\underset{R_2O}{\overset{R_1O}{\diagdown}}\overset{\overset{X}{\|}}{P}-S-O-R_3$$

wherein $R_1$ and $R_2$ are the same or different alkyl radicals, X is either oxygen or sulfur, and $R_3$ is a substituted or unsubstituted alkyl, aralkyl, cycloalkyl, alkoxyalkyl, mercaptoalkyl, or heterocyclic radical, or a dialkyl phosphorothio radical selected from the group consisting of those represented by one of the formulae:

$$\underset{R_2}{\overset{R_1}{\diagdown}}\overset{\overset{X}{\|}}{P}-S-R_4- \quad \text{and} \quad \underset{R_2}{\overset{R_1}{\diagdown}}\overset{\overset{X}{\|}}{P}-S-X-R_4-$$

wherein X, $R_1$ and $R_2$ as defined above and $R_4$ is a phenylene or alkylene which may or may not include an ether or a thio ether linkage.

Suitable substituents for the radicals represented in the general formula by $R_3$ are nitro, halo, alkoxy, cyano, or phenyl groups and mixtures thereof. The heterocyclic radicals represented by $R_3$ are those containing one or more atoms of sulfur, oxygen, and/or nitrogen, as for example, furan, thiophene, pyrimidine, pyrrole, pyrazole, imidazole, triazole, oxazole, isothiazole, benzofuran and coumarin. Among the preferred alkyl radicals represented by $R_1$ and $R_2$ of the phosphorus ester portion of the molecule are the methyl, ethyl, propyl, butyl, amyl, hexyl, octyl, and decyl. In general, carbon chains containing not more than 24 carbon atoms have been found satisfactory.

Preparations of the compounds of the present invention is accomplished by reacting a O,O-dialkyl phosphorosulfenyl halide with a compound having an active OH group (these are represented below by the formula $R_3OH$) in the presence of an acid acceptor. The reaction may be represented by the following equation:

$$\underset{R_2O}{\overset{R_1O}{\diagdown}}\overset{\overset{X}{\|}}{P}-S-Hal + R_3OH + (\text{acceptor}) \longrightarrow$$

$$\underset{R_2O}{\overset{R_1O}{\diagdown}}\overset{\overset{X}{\|}}{P}-S-O-R_3 + (\text{acceptor})\cdot H-(Hal)$$

wherein Hal preferably stands for chlorine or bromine, "acceptor" stands for a hydrogen halide acceptor, preferably a tertiary amine such as pyridine, triethylamine, trimethylamine and the like, and $R_1$, $R_2$, $R_3$, and X are defined above.

Generally, the reactions are carried out in a non-aqueous organic solvent to prevent possible side reactions between water and the O,O-dialkyl phosphorosulfenyl halide. However, some of the sulfenyl halides are comparatively unreactive with water and their reactions are suitably conducted in an aqueous medium. Most of the reactions are mildly exothermic and may be cooled slightly. Reaction temperatures above about 100° C. may cause appreciable decomposition of the reactants, while at temperatures below about −100° C. reaction usually proceeds at a negligibly slow rate. By a preferred method of the invention, a substantially stoichiometric amount of O,O-dialkylphosphorosulfenyl halide is added slowly to the appropriate reactant (containing an active OH group) which has been dissolved in a solvent together with a tertiary amine while maintaining the reaction temperature within the range of from −100° C. to 100° C. After complete reaction, the crude mixture is filtered and the solvent removed under vacuum.

Compounds of the general formula presented above in which $R_3$ is a substituted or unsubstituted aryl or alkaryl and $R_1$, $R_2$, and X are as previously defined, may also be prepared by the method of the present invention. A high degree of pesticidal and herbicidal activity have been found for these compounds bringing them also within the scope of the present invention.

The following examples illustrate specific compounds prepared by the method of the present invention:

*Example 1*

$$\underset{H_5C_2O}{\overset{H_5C_2O}{\diagdown}}PSOC_2H_5SC_2H_5$$

In a flask was placed 15.9 grams of $C_2H_5SC_2H_4OH$ and 15.1 grams of triethylamine in 150 ml. of ether. The solution was cooled to 10° C. and 30.5 grams of $(C_2H_5O)_2P(O)SCl$ was added over a 60 minute period. After the crude reaction mixture was filtered and the solvent removed under partial pressure, the product was stabilized by heating to 50° C. at 1 mm. of Hg. The yield was 36.0 grams of $(C_2H_5O)_2P(O)SOC_2H_4SC_2H_5$, having an index of refraction $N_D^{25}=1.4820$ and analyzing 10.9% P and 22.0% S as compared to 11.3% P and 23.4% S theoretical.

*Example 2*

$$\underset{H_5C_2O}{\overset{H_5C_2O}{\diagdown}}\overset{\overset{O}{\|}}{P}-SOC\underset{CH_2Br}{\overset{CH_2Br}{\diagup}}H$$

To a solution of 32.8 grams of $BrCH_2CH(OH)CH_2Br$ and 15.1 grams of triethylamine in 75 ml. of ether was added 30.5 grams of $(C_2H_5O)_2P(O)SCl$ over a 30 minute period at 10° C. The reaction mixture was stirred for an additional hour at room temperature and then filtered. After removing the solvent under partial pressure, the product was stabilized to 50° C. at 1.0 mm. of Hg. The yield was 55.5 grams of $$(C_2H_5O)_2P(O)SOCH(CH_2Br)_2$$

having an index of refraction $N_D^{25}=1.5026$ and analyzing as 7.3% P, 7.7% S, and 41.2% Br compared to 7.9% P, 8.3% S, and 41.5% Br theoretical.

*Example 3*

$$\underset{H_{17}C_8O}{\overset{H_{17}C_8O}{\diagdown}}\overset{\overset{O}{\|}}{P}-SOC\underset{CH_2Br}{\overset{CH_2Br}{\diagup}}H$$

Using the process described above, 21.8 grams of $BrCH_2CH(OH)CH_2Br$ was treated with 37.3 grams of $(C_8H_{17}O)_2P(O)SCl$ in the presence of triethylamine to yield 49.0 grams of $(C_8H_{17}O)_2P(O)SOCH(CH_2Br)_2$ having an index of refraction $N_D^{25}=1.4852$ and analyzing as 5.5% P, 5.5% S, and 27.8% Br compared to 5.6% P, 5.7% S, and 28.9% Br theoretical.

*Example 4*

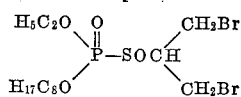

Using the process described above, 16.3 grams of $HOCH(CH_2Br)_2$ was treated with 21.6 grams of $(C_2H_5O)(C_8H_{17}O)P(O)SCl$ in the presence of 7.6 grams of triethylamine to yield 35.0 grams of $(C_2H_5O)(C_8H_{17}O)P(O)SOCH(CH_2Br)_2$ having an index of refraction $N_D^{25}=1.4761$ and analyzing as 6.8% P, 6.5% S, and 31.0% Br compared to 6.65% P, 6.8% S and 34.1% Br theoretical.

*Example 5*

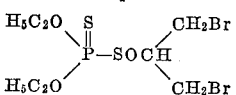

Using the process described above, 32.8 grams of $HOCH(CH_2Br)_2$ was treated with 33.0 grams of $(C_2H_5O)_2P(S)SCl$ in the presence of 15.1 grams of triethylamine giving 61.0 grams of $(C_2H_5O)_2P(S)SOCH(CH_2Br)_2$ having an index of refraction $N_D^{25}=1.5230$ and analyzing as 7.5% P, 14.5% S and 39.7% Br compared to 7.7% P, 15.9% S, and 39.8% Br theoretical.

*Example 6*

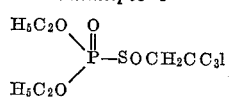

To a solution of 15.1 grams of triethylamine in 75 ml. of ether was added a mixture of 22.4 grams of $HOCH_2CCl_3$ and 30.4 grams of $(C_2H_5O)_2P(O)SCl$ over a 30 minute period at 10° C. After the reaction mixture had stirred for 30 more minutes at room temperature, it was filtered and the solvent was removed under partial pressure. The product was stabilized by heating to 50° C. at 1.0 mm. Hg to yield 44.5 grams of $(C_2H_5O)_2P(O)SOCH_2CCl_3$ having an index of refraction $N_D^{25}=1.4782$ and analyzing as 9.0% P, 9.5% S, and 31.2% Cl compared to 9.7% P, 10.1% S and 33.6% Cl theoretical.

*Example 7*

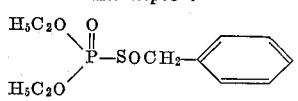

To a solution of 15.5 grams of triethylamine and 16.2 grams of $C_2H_5CH_2OH$ in 75 ml. of ether was added 30.4 grams of $(C_2H_5O)_2P(O)SCl$ over a 30 minute period at 10° C. After the crude product was stirred for an additional 30 minutes, the reaction mixture was filtered and the solvent removed under partial pressure. The reaction mixture was stabilized to 50° C. at 1.0 mm. Hg to yield 40.5 grams of $(C_2H_5O)_2P(O)SOCH_2C_6H_5$ having an index of refraction $N_D^{25}=1.5042$ and analyzing as 10.4% P and 10.9% S compared to 11.2% P and 11.6% S theoretical.

*Example 8*

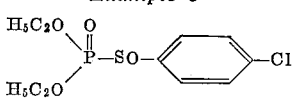

To a solution of 19.2 grams of p-chlorophenol and 15.3 grams of triethylamine in 75 ml. of ether was added 30.5 grams of $(C_2H_5O)_2P(O)SCl$ over a 30 minute period at 10° C. After the reaction mixture was stirred for an additional 60 minutes, it was filtered and the solvent was evaporated under partial pressure. The reaction product was stabilized to 50° C. at 1.0 mm. Hg to yield 47.0 grams of $(C_2H_5O)_2P(O)SOC_6H_4Cl$ having an index of refraction $N_D^{25}=1.5128$ and analyzing as 9.4% P, 9.7% S and 11.7% Cl, compared to 10.4% P. 10.6% S, and 12.0% Cl theoretical.

*Example 9*

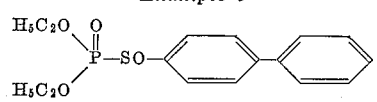

To a solution of 25.5 grams of p-phenyl phenol and 30.5 grams of $(C_2H_5O)_2P(O)SCl$ in 150 ml. of ether was added 15.2 grams of triethylamine at 10° C. over a 30 minute period. After the reaction mixture had stirred for an additional 60 minutes, it was filtered and the solvent was removed under partial pressure. The reaction product was stabilized to 50° C. at 1.0 mm. Hg to yield 50.0 grams of $(C_2H_5O)_2P(O)SOC_6H_4C_6H_5$ analyzing as 8.8% P and 8.2% S compared to 9.1% P and 9.5% S theoretical.

*Example 10*

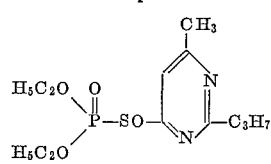

To a solution of 2-(isopropyl)-4-(methyl)-6-(hydroxy) pyrimidine in 250 ml. of benzene was added 30.5 grams of $(C_2H_5O)_2P(O)SCl$. The solution was cooled to 20° C. and 15.1 grams of triethylamine was added over a 30 minute period. After the reaction mixture was allowed to stir for another hour at room temperature, it was filtered and the solvent evaporated under partial pressure. The product was dried over $P_2O_5$ at 1.0 mm. of Hg to yield 46.0 grams of

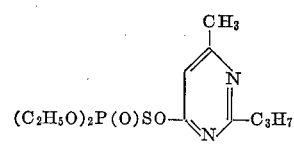

analyzing as 9.4% P and 9.8% S compared to 9.5% P and 10.0% S theoretical.

Using a procedure substantially in accordance with one or more of those described in the above examples, the following specific compounds were prepared:

*Example 11*

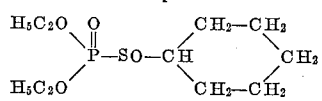

$N_D^{25}=1.4698$; yield=90.0%; percent P=11.5 (11.6 theory); percent S=11.0 (11.9 theory).

*Example 12*

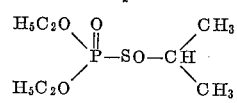

$N_D^{25}=1.4690$; yield=98.0%; percent P=15.0 (13.7 theory); percent S=15.0 (14.1 theory).

*Example 13*

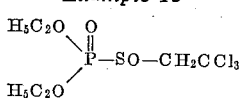

$N_D^{25}=1.4782$; yield=94.5%; percent P=9.0 (9.8 theory); percent S=16.7 (17.1 theory).

Example 14

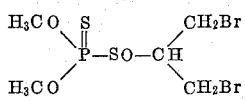

$N_D^{25}=1.5259$; yield=100.0%; percent P=8.0 (8.3 theory); percent S=16.7 (17.1 theory).

Example 15

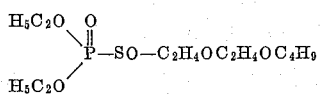

$N_D^{25}=1.4494$; yield=98.0%; percent P=9.0 (9.4 theory); percent S=9.1 (9.7 theory).

Example 16

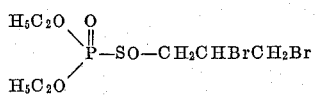

$N_D^{25}=1.5058$; yield=95.0%; percent P=7.8 (8.0 theory); percent S=7.1 (8.3 theory).

Example 17

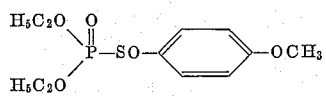

$N_D^{25}=1.5060$; yield=98.0%; percent P=9.6 (10.6 theory); percent S=9.4 (10.9 theory).

Example 18

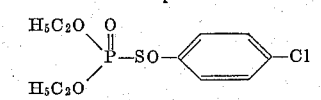

$N_D^{25}=1.5177$; yield=98.0%; percent P=8.8 (9.3 theory); percent S=8.1 (9.6 theory).

Example 19

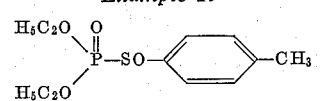

$N_D^{25}=1.5006$; yield=100%; percent P=10.1 (11.2 theory); percent S=10.0 (11.5 theory).

Example 20

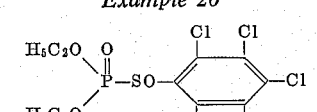

Yield=99.0%; percent P=8.1 (7.2 theory); percent S=7.3 (7.3 theory).

Example 21

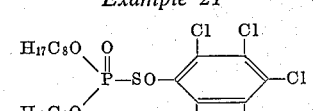

Yield=88.0%; percent P=5.15 (5.15 theory); percent S=4.8 (5.3 theory).

Example 22

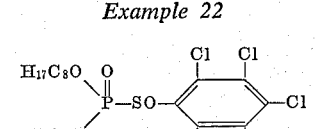

$N_D^{25}=1.4761$; yield=99.0%; percent P=6.9 (6.0 theory); percent S=5.7 (6.2 theory).

Example 23

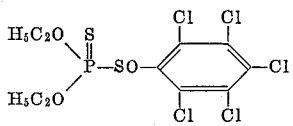

$N_D^{25}=1.5569$; yield=89%; percent P=6.92 (6.9 theory); percent S=14.9 (14.2 theory).

Example 24

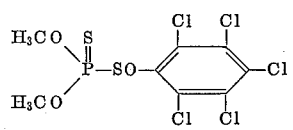

$N_D^{25}=1.5730$; yield=100%.

Example 25

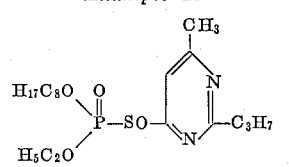

Yield=87%; percent P=8.0 (7.7 theory); percent S=8.2 (7.95 theory).

Example 26

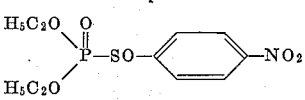

$N_D^{25}=1.5230$; yield=100%; percent P=9.6 (10.2 theory); percent S= 9.8 (10.9 theory).

Example 27

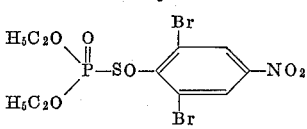

Yield=100%.

Example 28

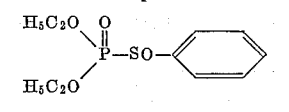

$N_D^{25}=1.4999$; percent P=10.6 (11.8 theory); percent S=10.4 (12.1 theory).

Example 29

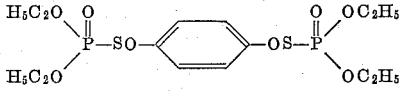

$N_D^{25}=1.4950$; percent P=13.1 (13.8 theory); percent S=14.0 (14.3 theory).

Example 30

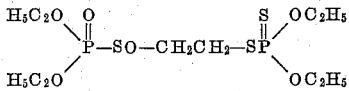

$N_D^{25}=1.4988$; percent P=13.9 (15.6 theory); percent S=22.0 (24.1 theory).

Example 31

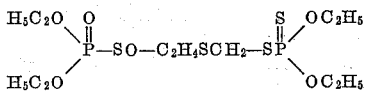

$N_D^{25}=1.5114$; percent P=12.8 (14.0 theory); percent S=25.0 (28.8 theory).

Example 32

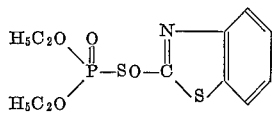

$N_D^{25}=1.5418$; percent P=10.3 (9.75 theory); percent S=18.3 (20.1 theory).

Example 33

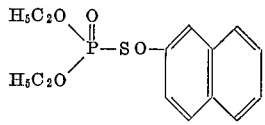

$N_D^{25}=1.5487$; percent P=9.0 (9.9 theory); percent S=9.7 (10.3 theory).

Example 34

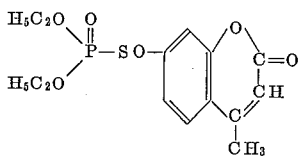

Percent P=8.41 (9.0 theory); percent S=8.60 (9.20 theory).

Example 35

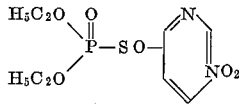

Percent P=8.8 (9.9 theory); percent S=9.7 (10.3 theory).

Example 36

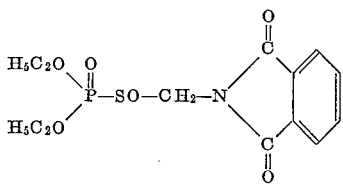

Percent P=8.9 (8.9 theory); percent S=8.1 (9.25 theory).

Pesticidal activity for the compounds of the foregoing examples is illustrated in Table I wherein the percentage kill is reported for a specified quantity of toxicant expressed in micrograms (hereafter termed the bioassay test) or for a percentage concentration of toxicant in aqueous solution (hereafter termed the screening test). A slanted line is used to separate the percentage kill, shown on the left, and the percentage concentration or quantity, shown on the right.

The following pest species were used in both screening and bioassay tests:

(1) House fly—*Musca domestica* (Linn.).
(2) American cockroach—*Periplaneta americana* (Linn.).
(3) Spotted milkweed bug—*Oncopeltus fasciatus* (Dallas).
(4) Confused flour beetle—*Tribolium confusum* (Duvol).
(5) Two-spotted mite—*Tetranychus telarius* (Linn.).
(6) Salt-marsh caterpillar—*Estigmene acrea* (Drury).

In the screening tests for insects numbered 1 to 4 above, from ten to twenty-five insects were caged in cardboard mailing tubes 3⅛" in diameter and 2⅝" tall. The cages were supplied within cellophane bottoms and screened tops. Food and water were supplied to each cage, except in the case of the confused flour beetle which was primarily tested to determine fumigant action. Dispersions of the test compounds were prepared by dissolving one half gram of the toxic material in ten milliliters of acetone. This solution was then diluted with water containing 0.015% Vatsol (a sulfonate-type wetting agent) and 0.005% methocel (methyl cellulose) as emulsifiers, the amount of water being sufficient to dilute the active ingredient to a concentration of 0.1% or below. The test insects were then sprayed with this solution. After twenty-four and seventy-two hours, counts were made to determine living and dead insects.

Compounds which showed high mortality of house flies in the screening test were bioassayed on *M. domestica*. In this test, a known quantity of the toxicant was placed in a confined area so that it was possible to calculate the exact amount of toxicant per fly. For the fly bioassay, the same cages were employed as for the screening tests. The toxicant was placed in a 60 mm. diameter petri dish along with 1 ml. of acetone containing light spray oil. After the solution air dried, a cage containing twenty-five female flies was placed over the residue. Counts of living and dead insects were made after twenty-four and seventy-two hours.

Essentially the same procedure was followed in the confused flour beetle bioassay as in the house fly bioassay. For this test, however, twenty adult beetles were used. Mortality was checked at twenty-four and forty-eight hours.

The miticidal screening test involved using young Pinto bean plants in the primary leaf stage as host plants for the mites. The beam plants were infested with several hundred mites and then sprayed to run-off with an aqueous test suspension prepared as described above. Sprayed plants were transferred to a greenhouse and held for fourteen days. The miticidal and ovicidal activity of the test compounds were determined after seven and fourteen days. The fourteen day reading was necessary for evaluating ovicidal action. Percentage mortality is reported, as shown in Table I, supra, for both post-embryonic and embryonic forms.

TABLE I

| Example | House Flies | American Roach, percent | Milkweed Bug, percent | Confused Flour Beetle | Two-spotted Mite Post emb., percent | Two-spotted Mite-eggs, percent | Salt-marsh Caterpillar, percent |
|---|---|---|---|---|---|---|---|
| 1 | 100/0.1% | 100/0.1 | 100/0.05 | 100/0.1% | 100/0.05 | 100/0.12 | 0/0.1 |
| 2 | 96/0.1% | 20/0.1 | 40/0.1 | 100/50μg | 90/0.12 | 90/0.12 | |
| 6 | 100/50μg | 40/0.1 | 100/0.05 | 100/50μg | 90/0.12 | 90/0.12 | 30/0.1 |
| 7 | 100/50μg | 100/0.1 | 80/0.05 | 100/50μg | 50/0.12 | 25/0.12 | 0/0.1 |
| 8 | 92/50μg | 40/0.1 | 60/0.1 | 100/50μg | 90/0.12 | 90/0.12 | 20/0.1 |
| 9 | 60/10μg | 100/0.1 | 70/0.01 | 100/50μg | 75/0.12 | 0/0.12 | 40/0.1 |
| 10 | 52/50μg | 100/0.1 | 30/0.01 | 100/50μg | | | 0/0.1 |
| 16 | 100/0.1% | 20/0.1 | 30/0.1 | 0/0.1% | 95/0.12 | 90/0.12 | 0/0.1 |
| 17 | 100/50μg | 80/0.05 | 100/0.1 | 100/50μg | 90/0.12 | 25/0.12 | 100/0.1 |
| 18 | 12/10μg | 100/0.1 | 100/0.1 | 100/0.1% | 50/0.12 | 25/0.12 | 20/0.1 |
| 19 | 100/50μg | 100/0.1 | 90/0.025 | 15/10μg | 50/0.12 | 0/0.12 | 0/0.1 |
| 20 | 92/50μg | 80/0.1 | 100/0.05 | 100/50μg | 100/0.12 | 90/0.12 | 80/0.1 |
| 21 | | | | | 70/0.1 | 0/0.1 | |
| 22 | 80/0.1% | 0/0.1 | 30/0.05 | 0/0.1% | 100/0.12 | 60/0.12 | |
| 28 | 100/50μg | 100/0.1 | 100/0.1 | 100/10μg | 50/0.12 | 25/0.12 | 30/0.1 |
| 29 | 100/50μg | 100/0.1 | 70/0.01 | 100/0.1% | 0/0.1 | 0/0.1 | |
| 30 | 100/0.1% | 40/0.1 | 0/0.1 | 100/0.1% | 90/0.12 | 50/0.12 | |
| 31 | 100/0.1% | 60/0.1 | 0/0.1 | 100/0.1% | 100/0.12 | 100/0.12 | 0/0.1 |
| 31 | | | | | 100/0.05 | 100/0.05 | |
| 31 | | | | | 75/0.01 | 0/0.01 | |

*Lepidopterous evaluation test.*—The test organism is the salt-marsh caterpillar, species No. 6 above, a representative member of an order containing a large number of economically important plant pests. Test solution of various concentrations were prepared by dissolving the active material in stock solutions of water containing wetting agents by the procedure outlined heretofore. Dock leaves approximately five inches long were dipped in these solutions for ten seconds. The leaves were then allowed to dry. A filter paper disk was placed in a one pound food container and moistened with one ml. of water. The dried dock leaves were then introduced into the container together with five third instar salt-marsh larvae. A petri dish cover was used for convenient observation. The tests were conducted for forty-eight hours. After twenty-four hours a fresh, undipped dock leaf was placed in the container. Mortality readings were taken at twenty-four and forty-eight hours.

The compounds of the present invention were also tested for herbicidal activity on some economically important plant species. The data obtained from such tests are reported in Table II wherein "0" indicates no appreciable herbicidal activity, "+" is slight injury, "++" is moderate injury, and "+++" is severe injury to plant life. The following reference characters are used in Table II to represent the indicated plant species:

A=annual bluegrass
B=bindweed
C=crabgrass
D=dock
E=watergrass
F=foxtail
G=pigweed
H=radish
J=jimson weed
M=mustard
N=oats (tame)
O=oats (wild)
P=pinto bean To more specifically define the type of activity observed, where substantial plant injury resulted, superscripts, such as S. I., Ge. etc., are shown in Table II.

Pre-emergence herbicidal tests were conducted following planting, but prior to emergence of the plants, usually the day following planting. The active compounds were applied at a concentration of 20 lbs. of active material, diluted in water to a volume of 80 gallons, for each acre treated. The aqueous herbicidal solution was simply sprayed on the pre-planted soil. After 14 days the plants were inspected and compared with an untreated control group planted on the same day. The usual plant species employed in this test were crabgrass, foxtail, watergrass, wild oats, pigweed, mustard, and dock.

Post-emergence herbicidal tests were initiated approximately two weeks following emergence of the test plants. The method of application involved spraying on the plant foliage a 0.2% aqueous solution of the active compound to the point of run-off. The concentration of active material at this point was approximately 25 pounds per planted acre. The usual plant species employed in post-emergence herbicidal testing were annual bluegrass, bindweed, foxtail, mustard, wild oats and pinto bean. Evaluation of herbicidal activity was accomplished after 14 to 19 days.

Although the specific examples show the use of aqueous solutions of the toxic compounds as insecticides and herbicides, they may also be used in the form of emulsions, non-aqueous solutions, wettable powders, vapors, and dusts as may be best suited to the conditions of use. For more specialized applications, the toxic material may even be used in a pure undiluted form.

The term "pest" is used herein in the restricted sense generally recognized in the art as applying to the lower forms of life customarily controlled by chemical means and excluding the higher animals, the vertebrates, e.g., rodents, birds, and larger forms, which are more commonly controlled by mechanical means such as traps. In its broadest usage, the term refers to both the destructive or annoying household or plant pest organisms, especially the parasites and pathogens. It will be apparent to one skilled in the art that the toxic activity demonstrated on the selected arthropods, arachnids, and lepidopterous larvae is indicative of toxic activity in various species and orders not specifically shown.

The foregoing description is given for clearance of understanding only and no unnecessary limitations should be understood therefrom, as modifications will be obvious to those skilled in the art.

TABLE II

| Example (Compound) | Mode of Application | A | B | C | D | E | F | G | H | J | M | N | O | P |
|---|---|---|---|---|---|---|---|---|---|---|---|---|---|---|
| 2 | Post-emergence | 0 | 0 | | | | 0 | | | | 0 | | 0 | +++ S. I. |
| 6 | do | 0 | 0 | | | | 0 | | | | 0 | | 0 | +++ S. I. |
| 6 | Pre-emergence | | | +++ Ge. | | | 0 | +++ Ge. | | | 0 | 0 | 0 | |
| 10 | do | | | 0 | + | + | + | ++ | | | | | + | |
| 11 | Post-emergence | 0 | 0 | | | | 0 | | | | 0 | | 0 | +++ S. I. L. M. |
| 17 | do | | 0 | 0 | | | 0 | | | | 0 | | 0 | +++ T. D. |
| 20 | do | +++ De. | ++ | | | | +++ De. | | | | +++ De. | | +++ De. | ++ |
| 20 | Pre-emergence | ++ | + | | | | | | | | ++ | 0 | + | |
| 21 | Post-emergence | +++ De. | + | | | | +++ De. | | | | + | | 0 | 0 |
| 21 | Pre-emergence | + | ++ | | | + | + | +++ Ge. | | | 0 | | + | |
| 22 | Post-emergence | | +++ | | | +++ | +++ | +++ | | | +++ | | +++ | + |
| 22 | Pre-emergence | ++ | | | | + | ++ | +++ | | | + | | + | |
| 28 | do | | | 0 | | | + | + | | + | + | + | + | |
| 29 | Post-emergence | | + | | | + | ++ | | + | | | | 0 | +++ De. |
| 29 | Pre-emergence | | | ++ | 0 | + | ++ | + | | | 0 | | + | |
| 30 | Post-emergence | | 0 | 0 | | | 0 | | | | 0 | | 0 | +++ T. D. |

S. I. represents shortened intermode; Ge. represents germination; L. M. represents leaf malformation; De. represents desiccation; T. D. represents tip dead.

What we claim is:

1. A compound represented by the general formula:

$$\begin{array}{c} R_1O \\ \phantom{R_1O}\diagdown \\ \phantom{RR}P-S-O-R_3 \\ \phantom{RR}\diagup \\ R_2O \end{array} \quad \overset{X}{\underset{}{\|}}$$

wherein $R_1$ and $R_2$ are alkyl radicals, X is selected from the group consisting of sulfur and oxygen and $R_3$ is selected from the group consisting of unsubstituted lower alkyl, bromo substituted lower alkyl, chloro substituted lower alkyl, benzyl, cyclohexyl, lower alkoxy-lower alkyl, ethylmercaptoethyl, pyridyl, coumarinyl, benzthiazyl, pyrimidyl, naphthyl, phthalimidomethylene, and dialkyl phosphorothio radicals represented by one of the formulae:

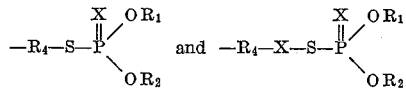

wherein X, $R_1$, and $R_2$ are as defined above and $R_4$ is selected from the group consisting of lower alkylene, phenylene, lower alkylene ether, and lower alkylene thio ether.

2. The compound of the following formula:

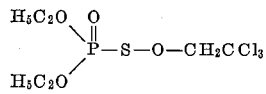

3. The compound of the following formula:

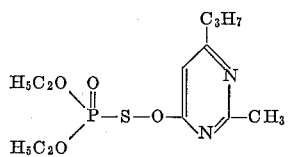

4. The compound of the following formula:

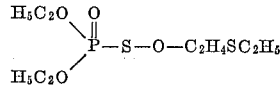

5. The compound of the following formula:

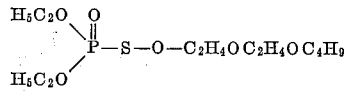

6. The compound of the following formula:

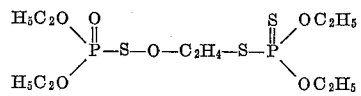

References Cited by the Examiner

UNITED STATES PATENTS

| | | | |
|---|---|---|---|
| 2,704,757 | 3/1955 | Dornfeld | 260—251 |
| 2,818,364 | 12/1957 | Birum | 167—22 |
| 2,898,205 | 8/1959 | Pyne et al. | 71—2.5 |
| 2,911,294 | 11/1959 | Eden | 71—2.5 |
| 2,925,419 | 2/1960 | Diriwachter | 260—251 |
| 2,943,974 | 7/1960 | Metivier | 167—22 |
| 2,954,319 | 9/1960 | Hendrik et al. | 167—30 |
| 3,010,871 | 11/1961 | Gilbert | 167—30 |
| 3,018,215 | 1/1962 | Piankas | 167—22 |

OTHER REFERENCES

Lowy et al., Introduction to Organic Chemistry, Seventh Edition (1951), pages 215–6.

HENRY R. JILES, *Acting Primary Examiner.*
NICHOLAS S. RIZZO, *Examiner.*